United States Patent
Takayama

(10) Patent No.: US 10,762,661 B2
(45) Date of Patent: Sep. 1, 2020

(54) IMAGING DEVICE, IMAGING METHOD AND STORAGE MEDIUM

(71) Applicant: CASIO COMPUTER CO., LTD., Shibuya-ku (JP)

(72) Inventor: Yoshihiro Takayama, Nakano (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/360,941

(22) Filed: Mar. 21, 2019

(65) Prior Publication Data

US 2019/0295284 A1 Sep. 26, 2019

(30) Foreign Application Priority Data

Mar. 23, 2018 (JP) .................. 2018-057077

(51) Int. Cl.
*G06T 7/70* (2017.01)
*G06K 9/00* (2006.01)
*H04N 5/232* (2006.01)

(52) U.S. Cl.
CPC ............ *G06T 7/70* (2017.01); *G06K 9/00664* (2013.01); *H04N 5/23238* (2013.01); *G06K 9/00228* (2013.01); *G06K 2209/01* (2013.01); *G06T 2207/30242* (2013.01); *G06T 2207/30244* (2013.01)

(58) Field of Classification Search
CPC ............. G06T 7/70; G06T 2207/30242; G06T 2207/30244; G06K 9/00664; G06K 9/00228; G06K 2209/01; H04N 5/23238
See application file for complete search history.

(56) References Cited

U.S. PATENT DOCUMENTS

| 7,564,486 B2 | 7/2009 | Ikeda | |
|---|---|---|---|
| 8,593,558 B2* | 11/2013 | Gardiner | G06F 3/012 348/333.12 |
| 2003/0152289 A1* | 8/2003 | Luo | G06K 9/3208 382/289 |
| 2005/0088536 A1 | 4/2005 | Ikeda | |
| 2009/0129636 A1* | 5/2009 | Mei | G06K 9/00228 382/118 |
| 2010/0039523 A1* | 2/2010 | Lin | H04N 5/23293 348/222.1 |

(Continued)

FOREIGN PATENT DOCUMENTS

| JP | 2005-130468 | 5/2005 |
|---|---|---|
| JP | 2009-302910 | 12/2009 |
| JP | 2011-035769 | 2/2011 |

*Primary Examiner* — John R Schnurr
(74) *Attorney, Agent, or Firm* — Cozen O'Connor

(57) ABSTRACT

An object is to easily and appropriately identify the orientation of imaging means at the time of image capturing. A control section of an imaging device or an image processing device acquires an image captured by an imaging section and performs image recognition processing of recognizing a photographic subject corresponding to a first orientation such as a horizontal imaging orientation or a vertical imaging orientation in the image so as to judge whether a predetermined photographic subject is present in the image. Then, based on the judgment result, the control section identifies whether the orientation of the imaging device or the imaging section at the time of image capturing is the first orientation or a second orientation.

13 Claims, 8 Drawing Sheets

(56) References Cited

U.S. PATENT DOCUMENTS

| | | | |
|---|---|---|---|
| 2010/0316295 A1* | 12/2010 | Morimoto | G06K 9/3208 |
| | | | 382/182 |
| 2012/0081572 A1* | 4/2012 | Yu | H04N 5/77 |
| | | | 348/231.3 |
| 2014/0140609 A1* | 5/2014 | Krishnaswamy | G06T 7/70 |
| | | | 382/159 |
| 2014/0241635 A1* | 8/2014 | Ruppaner | G06K 9/00228 |
| | | | 382/197 |
| 2016/0373612 A1* | 12/2016 | Zhang | G06K 9/3208 |

* cited by examiner

FIG. 2A

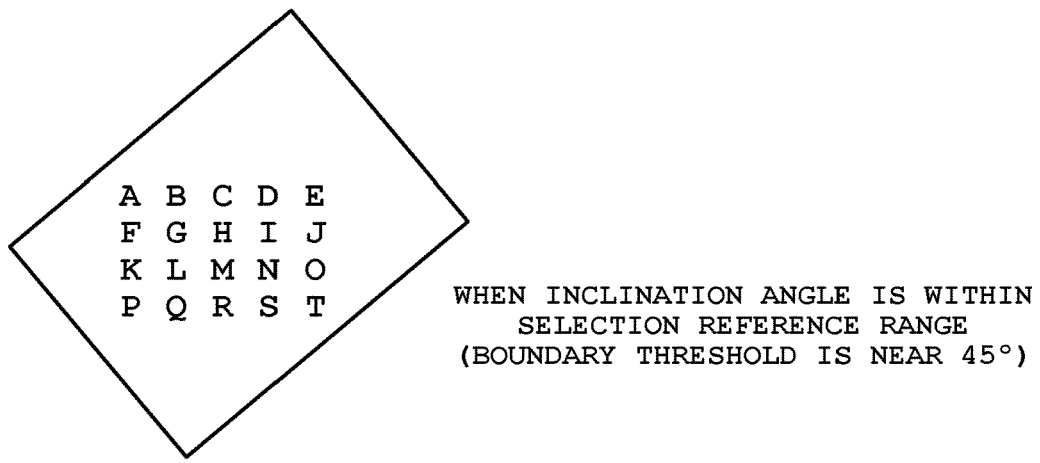

WHEN INCLINATION ANGLE IS WITHIN SELECTION REFERENCE RANGE (BOUNDARY THRESHOLD IS NEAR 45°)

FIG. 2B

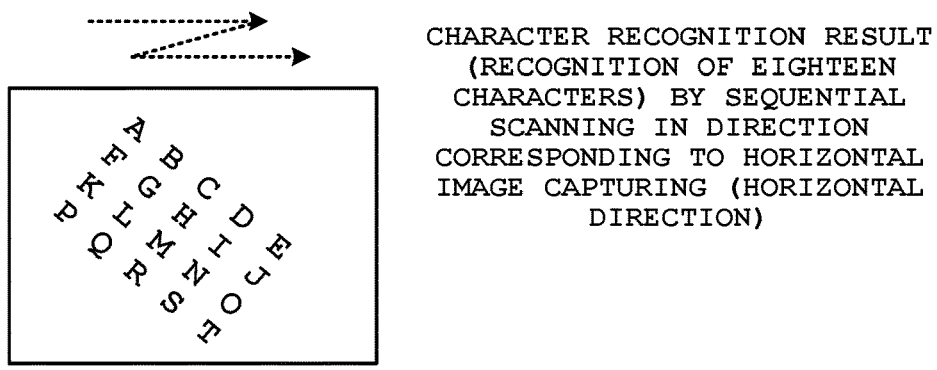

CHARACTER RECOGNITION RESULT (RECOGNITION OF EIGHTEEN CHARACTERS) BY SEQUENTIAL SCANNING IN DIRECTION CORRESPONDING TO HORIZONTAL IMAGE CAPTURING (HORIZONTAL DIRECTION)

FIG. 2C

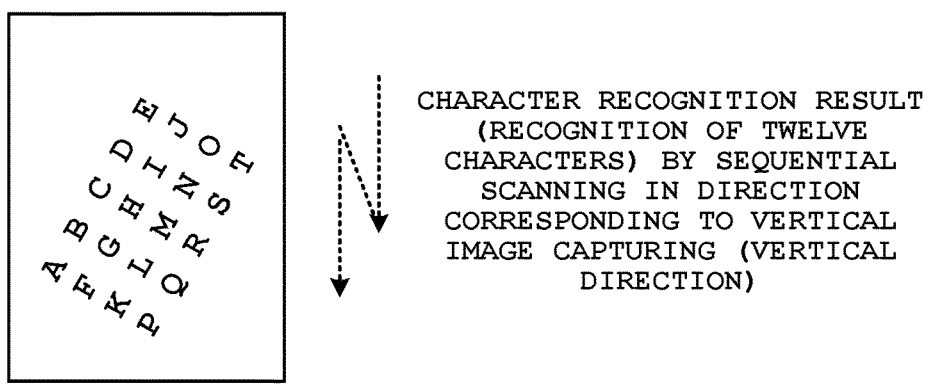

CHARACTER RECOGNITION RESULT (RECOGNITION OF TWELVE CHARACTERS) BY SEQUENTIAL SCANNING IN DIRECTION CORRESPONDING TO VERTICAL IMAGE CAPTURING (VERTICAL DIRECTION)

FIG. 3A

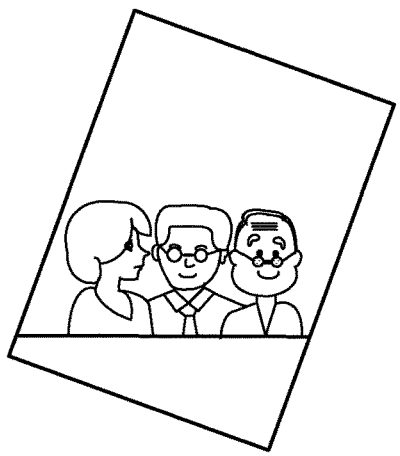

WHEN INCLINATION ANGLE IS WITHIN SELECTION REFERENCE RANGE (BOUNDARY THRESHOLD IS NEAR 45°)

FIG. 3B

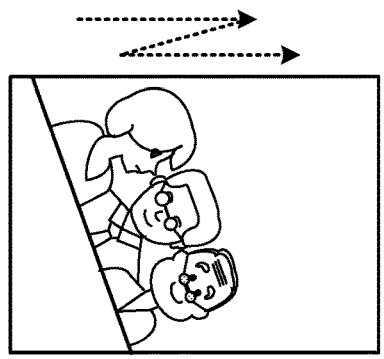

FACE DETECTION RESULT (DETECTION OF ONE PERSON) BY SEQUENTIAL SCANNING IN DIRECTION CORRESPONDING TO HORIZONTAL IMAGE CAPTURING (HORIZONTAL DIRECTION)

FIG. 3C

FACE DETECTION RESULT (DETECTION OF THREE PERSONS) BY SEQUENTIAL SCANNING IN DIRECTION CORRESPONDING TO VERTICAL IMAGE CAPTURING (VERTICAL DIRECTION)

HEMISPHERICAL IMAGE

HEMISPHERICAL IMAGE

HEMISPHERICAL IMAGE

HEMISPHERICAL IMAGE

IMAGING DEVICE, IMAGING METHOD AND STORAGE MEDIUM

CROSS-REFERENCE TO RELATED APPLICATION

This application is based upon and claims the benefit of priority from the prior Japanese Patent Application No. 2018-057077, filed Mar. 23, 2018, the entire contents of which are incorporated herein by reference.

BACKGROUND OF THE INVENTION

1. Field of the Invention

The present invention relates to an imaging device, an imaging method and a storage medium for identifying the orientation of imaging means when image capturing is performed.

2. Description of the Related Art

When the orientation of an imaging device such as a compact camera is greatly changed with respect to a photographic subject, for example, when the orientation is changed from a horizontal imaging orientation to a vertical imaging orientation or vice versa, an image acquired at that time is displayed for playback after being rotated in accordance with the orientation of the imaging device at the time of the image capturing so that the photographic subject is correctly oriented. That is, in a case where a photographic subject is photographed with a vertical composition, image capturing is performed with the vertical imaging orientation. In a case where a photographic subject is photographed with a horizontal composition, image capturing is performed with the horizontal imaging orientation. Here, in the imaging device, when the inclination angle of the imaging device at the time of the image capturing is detected by an orientation detection sensor, the orientation of the imaging device at the time of the image capturing is identified based on the detected inclination angle, and information indicating the orientation is added to meta data of the image file. Then, in the playback of the image, the imaging device reads out this information indicating the orientation, identifies the orientation at the time of the image capturing, and rotates and displays the image such that the orientation of the photographic subject coincides with that orientation (horizontal display or vertical display).

In this case, the imaging device compares the inclination angle acquired by the orientation detection sensor with a predetermined threshold value set in advance and, based on the comparison result, identifies the orientation at the time of the image capturing. This predetermined threshold value is a threshold value that serves as a reference for judging whether the imaging device is in the horizontal imaging orientation or is in the vertical imaging orientation. When its inclination angle is around the threshold value, that is, when the inclination angle is close to the threshold value, the orientation of the imaging device is difficult to be correctly judged. On the other hand, as a technique for identifying the orientation of an imaging device at the time of image capturing without using an orientation detection sensor, Japanese Patent Application Laid-Open (Kokai) Publication No. 2009-302910 discloses a technique in which whether an imaging device is in the horizontal imaging orientation or in the vertical imaging orientation is judged based on a captured image of a photographic subject and a captured image of the photographer himself/herself.

SUMMARY OF THE INVENTION

In accordance with one aspect of the present invention, there is provided an image processing device which identifies whether an orientation of an imaging section at time of image capturing is a first orientation or a second orientation, comprising: a memory; and a Central Processing Unit (CPU), wherein the CPU performs, based on a program stored in the memory, processing including: acquiring an image captured by the imaging section; performing first image recognition processing of recognizing a photographic subject corresponding to the first orientation in the acquired image so as to judge whether a predetermined photographic subject is present in the image; and identifying whether the orientation of the imaging section at the time of image capturing is the first orientation or the second orientation based on a judgment result acquired by the first image recognition processing.

In accordance with another aspect of the present invention, there is provided an image processing method for identifying whether an orientation of an imaging section at time of image capturing is a first orientation or a second orientation, comprising: acquiring an image captured by the imaging section, performing first image recognition processing of recognizing a photographic subject corresponding to the first orientation in the acquired image so as to judge whether a predetermined photographic subject is present in the image; and identifying whether the orientation of the imaging section at the time of image capturing is the first orientation or the second orientation based on a judgment result acquired by the first image recognition processing.

In accordance with another aspect of the present invention, there is provided a non-transitory computer-readable storage medium having stored thereon a program that is executable by a computer of an image processing device which identifies whether an orientation of an imaging section at time of image capturing is a first orientation or a second orientation, the program being executable by the computer to actualize functions comprising: acquiring an image captured by the imaging section, performing first image recognition processing of recognizing a photographic subject corresponding to the first orientation in the acquired image so as to judge whether a predetermined photographic subject is present in the image; and identifying whether the orientation of the imaging section at the time of image capturing is the first orientation or the second orientation based on a judgment result acquired by the first image recognition processing.

In accordance with another aspect of the present invention, there is provided an image processing method for identifying whether an orientation of an imaging section at time of image capturing is a first orientation or a second orientation, comprising: acquiring a hemispherical image captured by the imaging section; performing first image recognition processing of (i) recognizing a photographic subject in an area which is one of a peripheral area and a center area of the acquired hemispherical image and is associated with the first orientation and (ii) judging whether a predetermined photographic subject is present in the area; and identifying whether the orientation of the imaging section at the time of image capturing is the first orientation or the second orientation based on a judgment result acquired by the first image recognition processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2A to FIG. 2C are diagrams showing specific examples for describing a method of identifying the orientation of the imaging device at the time of image capturing;

FIG. 3A to FIG. 3C are diagrams showing other specific examples for describing the method of identifying the orientation of the imaging device at the time of image capturing;

DETAILED DESCRIPTION OF THE PREFERRED EMBODIMENTS

Embodiments of the present invention will hereinafter be described in detail with reference to the drawings.

First Embodiment

First, a first embodiment of the present invention is described with reference to FIG. 1 to FIG. 5.

Figure 1:
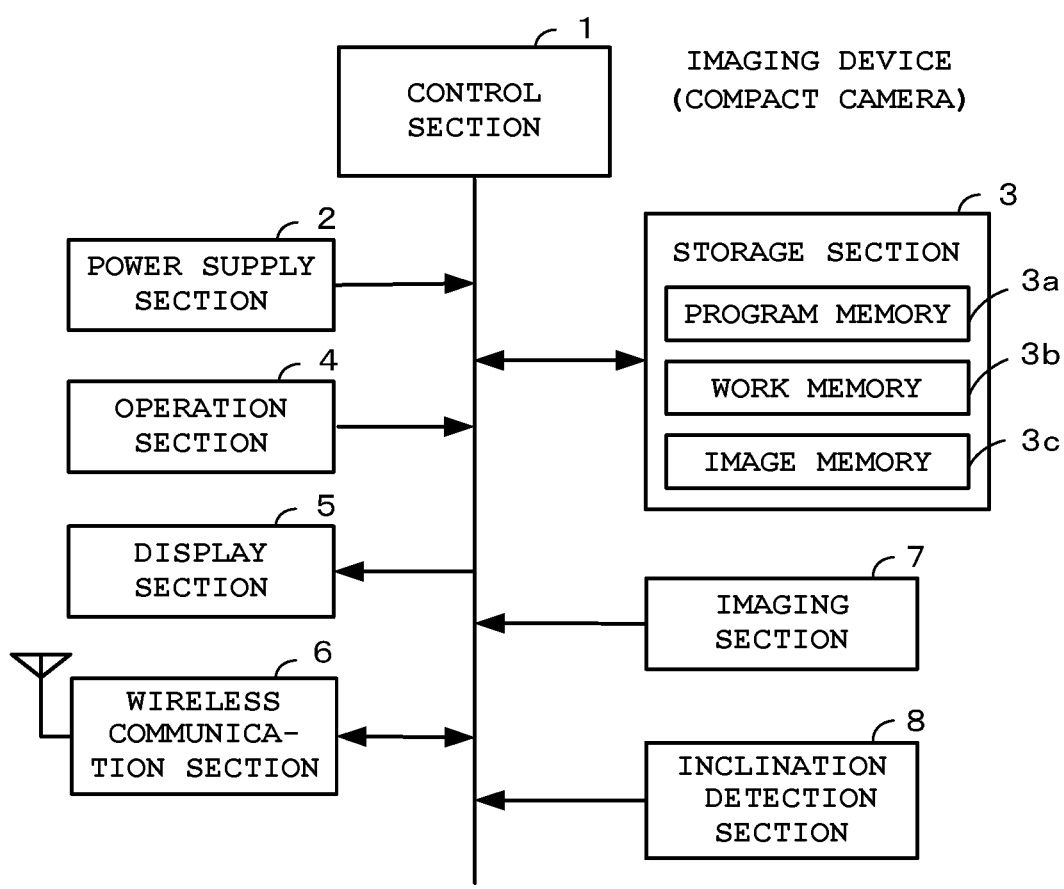
FIG. 1 is a block diagram showing basic components of a compact camera where the present invention has been applied as an imaging device.

The first embodiment exemplarily shows a compact camera as an imaging device (image processing device) where the present invention has been applied. FIG. 1 is a block diagram showing basic components of the compact camera (image processing device).

A control section 1 in FIG. 1 is operated by power supply from a power supply section (secondary battery) 2 and controls the entire operation of the imaging device in accordance with various programs stored in a storage section 3. In this control section 1, a Central Processing Unit (CPU), a memory and the like not shown are provided. The storage section 3 is constituted by a ROM (Read Only Memory), a flash memory and the like, and has a program memory 3a having stored therein programs and various applications for actualizing the first embodiment in accordance with the operation procedure shown in FIG. 4 and FIG. 5, a work memory 3b for temporarily storing data such as flags, an image memory 3c for storing and saving captured images and the like.

This storage section 3 may be structured to include a removable portable memory (recording medium) such as an SD (Secure Digital) card or a USB (Universal Serial Bus) memory, or may be structured to include a storage area on a predetermined server apparatus side in a case where the imaging device is connected to a network by a communication function. An operation section 4 in FIG. 1 includes, although not shown in the drawing, a power supply key for power ON/OFF, a mode key for switching between an imaging mode and a replay mode, a release key for giving an instruction to start image capturing, a zoom lever, a setting key for arbitrarily setting imaging parameters such as exposure and shutter speed and the like. A display section 5 in FIG. 1 is constituted by a high-definition liquid-crystal display or the like, and its display screen serves as a monitor screen (live view screen) for displaying an image to be captured (live view image) in real time or a replay screen for replaying a captured image. A wireless communication section 6 in FIG. 1 actualizes a short-range wireless communication function in Bluetooth (registered trademark) standards or a wireless LAN (Local Area Network) function.

An imaging section 7 in FIG. 1 is a section for actualizing a camera capable of capturing an image of a photographic subject with high definition and, although not shown in the drawing, has a normal standard lens, a zoom lens, a focus lens, an aperture/shutter, and an image sensor. This imaging section 7 adjusts Automatic Focus (AF) and Automatic Exposure (AE), and starts or ends image capturing in response to an instruction from the control section 1. An image signal (analog-value signal) acquired by photoelectric conversion by this imaging section 7 is subjected to digital conversion to be displayed on the display section 5 as a live view image. Also, the control section 1 performs image processing such as image-blurring correction, white balance adjustment, and sharpness adjustment on a captured image, and then causes the image to be compressed to be a predetermined size and recorded and stored in the image memory 3c of the storage section 3 (such as a SD card).

An inclination detection section 8 in FIG. 1 has various sensors such as a triaxial (X axis, Y axis, and Z axis) acceleration sensor and a gyro sensor, and detects acceleration, inclination, direction and the like. This inclination detection section 8 is a three-dimensional motion sensor capable of detecting various motions such as slow motions and quick motions by taking advantage of the characteristics of the sensors, and is used as a sensor for detecting the orientation of the imaging device (imaging section 7) at the time of image capturing (orientation at the time of image capturing). That is, the control section 1 detects rotation angles with three axes orthogonal to one another as rotation axes, and thereby detects an inclination angle with respect to a gravity direction as an orientation at the time of image capturing. In addition, the control section 1 compares acceleration components on the X axis, Y axis, and Z axis, and detects an axis with a larger component as an inclination direction. Note that the entire imaging device is constituted by a thin rectangular housing. Here, for example, the direction of the short side of the housing is taken as an X-axis direction of the three axes, the direction of the long side of the housing is taken as a Y-axis direction thereof, and the thickness direction of the housing is taken as a Z-axis direction thereof. For example, when the rotation angles around the X axis, Y axis, and Z axis are represented as Euler angles, the inclination angle around the Y axis is a roll angle, the inclination angle around the X axis is a pitch angle, and the inclination angle around the Z axis is a yaw angle.

Based on the above-described inclination angle detected by the inclination detection section 8, the control section 1 identifies whether the orientation of the imaging device (imaging section 7) at the time of image capturing (imaging orientation) is a first orientation or a second orientation. More specifically, an angle range for identifying the first orientation and an angle range for identifying the second orientation are set and, in this state, the control section 1 judges to which angle range an inclination angle detected by the inclination detection section 8 belongs. Then, based on the judgment result, the control section 1 identifies whether the orientation of the imaging device at the time of image capturing is the first orientation or the second orientation. Here, in the first embodiment, the "first orientation" refers to a horizontal imaging orientation with which an image having a horizontal composition can be captured, and the "second orientation" refers to a vertical imaging orientation with which an image having a vertical composition can be captured. When the imaging device is held with its optical axis being horizontally oriented, the control section 1 identifies whether the current imaging orientation is the first orientation (horizontal imaging orientation) or the second orientation (vertical imaging orientation) based on an rotation angle (inclination angle) around the Z axis. That is, an orientation when the imaging device having the rectangular housing is held horizontally, that is, an orientation when the long-side direction (Y-axis direction) of that housing is a horizontal direction is identified as the first orientation (horizontal imaging orientation), and an orientation when the imaging device is held vertically, that is, an orientation when the short-side direction (X-axis direction) of the housing is a horizontal direction is identified as the second orientation (vertical imaging orientation).

Between the first orientation and the second orientation, a reference value (boundary threshold value) is set for judging between the horizontal imaging orientation and the vertical imaging orientation. The control section 1 compares this predetermined threshold value (boundary threshold value) and an inclination angle detected by the inclination detection section 8 and, based on the comparison result, identifies whether an imaging orientation is the first orientation or the second orientation. In the following descriptions, this method of identifying an imaging orientation based on an inclination angle detected by the inclination detection section 8 is referred to as a "inclination-angle-based orientation identification method". In the first embodiment, a "subject-based orientation identification method" (which will be described further below) is also used. That is, in the first embodiment, an imaging orientation is identified by using one of the "inclination-angle-based orientation identification method" and the "subject-based orientation identification method".

Selection between these two identification methods is made based on whether an inclination angle detected by the inclination detection section 8 is within a predetermined angle range. This "predetermined angle range" is set in advance as a reference for selecting a method of identifying an orientation at the time of image capturing. That is, the control section 1 refers to this predetermined angle range (selection reference range) and, when an inclination angle detected by the inclination detection section 8 is not within this selection reference range, selects the "inclination-angle-based orientation identification method" fro use. When the inclination angle is within this selection reference range, the control section 1 selects the "subject-based orientation identification method" for use. Here, when the above-described predetermined threshold value (boundary threshold value) is "θ" and a predetermined angle close to the predetermined threshold value is "α", the selection reference range is "θ±α", that is, an angle range near the boundary threshold value, in the first embodiment.

For example, in the case of "θ=45°" and "α=10°", the above-described selection reference range, that is, the angle range near the boundary threshold value is an angle range of "45°±10°". The value of this "α" can be arbitrarily set by a user operation. For example, when the set α is changed to "α=5", the selection reference range becomes "45°±5°" and the angle range becomes narrow. When the set α is changed to "α=15", the selection reference range becomes "45°±15°" and the angle range becomes wide. In the first embodiment, the value of "α" is arbitrarily set in consideration of the way of holding the imaging device, the handling habit of the user and the like. Here, the same value may be set to all the three axes, or slightly different values may be set in consideration of the habit of the user and the like.

In the above-described example, the angle range (selection reference range) that is a reference for selecting an orientation identification method to be used is an angle range near the boundary threshold value. However, the selection reference range is not limited thereto. For example, in the setting where an angle range for identifying the first orientation is "0°±20°" and an angle range for identifying the second orientation is "90°±20°", that is, in the setting where a judgment that switching has been performed from the second orientation to the first orientation is made when an inclination angle detected by the inclination detection section 8 is within the angle range of "0°±20°" on the first orientation side and a judgment that switching has been performed from the first orientation to the second orientation is made when an inclination angle detected by the inclination detection section 8 is within the angle range of "90°±20°" on the second orientation side, the selection reference range may be between the angle range of the first orientation side and the angle range of the second orientation side, that is, an angle range of "20° to 70°".

FIG. 2A to FIG. 2C are diagrams showing specific examples for describing the "subject-based orientation identification method".

FIG. 2A is a diagram exemplarily showing a case where image capturing has been performed with a character string as a photographic subject. Here, the imaging device at the time of image capturing has been oriented to be diagonally inclined at an angle of substantially 45°, that is, the inclination angle of the imaging device acquired by the inclination detection section 8 is within an angle range in which whether the inclination angle is within an angle range for identifying the first orientation or within an angle range for identifying the second orientation (a case where "45°±10°" is an angle range near a boundary threshold value of 45°) is difficult to be identified.

FIG. 2B shows a state where an image diagonally inclined as in FIG. 2A has been rotated in the clockwise direction to be in a horizontal orientation so as to correspond to the first orientation (horizontal imaging orientation). The control section 1 performs image recognition processing for recognizing a photographic subject corresponding to this first orientation. For example, the control section 1 performs simple image recognition processing (character recognition processing) for sequentially scanning (single scanning) in one direction (horizontal direction) on the image horizontally oriented to correspond to the first orientation (horizontal imaging orientation). Then, the control section 1 counts the number of characters recognized as photographic subjects corresponding to the first orientation. In the example shown in the drawing, eighteen out of twenty characters have been recognized.

FIG. 2C shows an state where the image of FIG. 2A (image diagonally captured at an angle of 45°) has been rotated in the counterclockwise direction to be in a vertical orientation so as to correspond to the second orientation (vertical imaging orientation). The control section 1 performs image recognition processing for recognizing a photographic subject corresponding to this second orientation. For example, the control section 1 performs simple image recognition processing (character recognition processing) for sequentially scanning (single scanning) in one direction (vertical direction) on the image vertically oriented to correspond to the second orientation (vertical imaging orientation). Then, the control section 1 counts the number of characters recognized as photographic subjects corresponding to the second orientation. In the example shown in the drawing, twelve out of twenty characters have been recognized. Then, the control section 1 compares the number of characters recognized in the character recognition processing corresponding to the horizontal imaging orientation and that corresponding to the vertical imaging orientation and, based on the comparison result, identifies the orientation at the time of the image capturing.

FIG. 3A to FIG. 3C are diagrams showing other specific examples for describing the "subject-based orientation identification method".

Here, FIG. 3A to FIG. 3C are diagrams exemplarily showing a case which is basically the same as the case of FIG. 2A to FIG. 2C except that photographic subjects therein are a plurality of persons. That is, FIG. 3A exemplarily shows a case in which an image of a plurality of persons serving as photographic subjects has been captured with the imaging section 7 being diagonally inclined at 45° that is the predetermined threshold value (boundary threshold value), and the orientation at the time of the image capturing is difficult to be identified as in the case of FIG. 2A.

As with the case in FIG. 2B, FIG. 3B shows a state where the image of FIG. 3A (image diagonally captured at an angle of 45°) has been rotated in the clockwise direction to be in the horizontal orientation so as to correspond to the first orientation (horizontal imaging orientation). The control section 1 performs image recognition processing for recognizing photographic subjects corresponding to this first orientation. For example, the control section 1 performs simple image recognition processing (face detection processing) for sequentially scanning (single scanning) in one direction (horizontal direction) on the image horizontally oriented to correspond to the first orientation (horizontal imaging orientation). Then, the control section 1 counts the number of faces recognized as photographic subjects corresponding to the first orientation. In the example shown in the drawing, one of three persons has been recognized.

FIG. 3C shows a state where the image of FIG. 3A (image diagonally captured at an angle of 45°) has been rotated to in the counterclockwise direction to be in the vertical orientation so as to correspond to the second orientation (vertical imaging orientation). The control section 1 performs image recognition processing for recognizing a photographic subject corresponding to this second orientation. For example, the control section 1 performs simple image recognition processing (face detection processing) for sequentially scanning (single scanning) in one direction (vertical direction) on the image vertically oriented to correspond to the second orientation (vertical imaging orientation). Then, the control section 1 counts the number of faces recognized as photographic subjects corresponding to the second orientation. In the example shown in the drawing, three out of three characters have been recognized. Then, the control section 1 compares the number of persons recognized in the face detection processing corresponding to the horizontal imaging orientation and that corresponding to the vertical imaging orientation and, based on the comparison result, identifies the orientation at the time of the image capturing.

Figure 4:
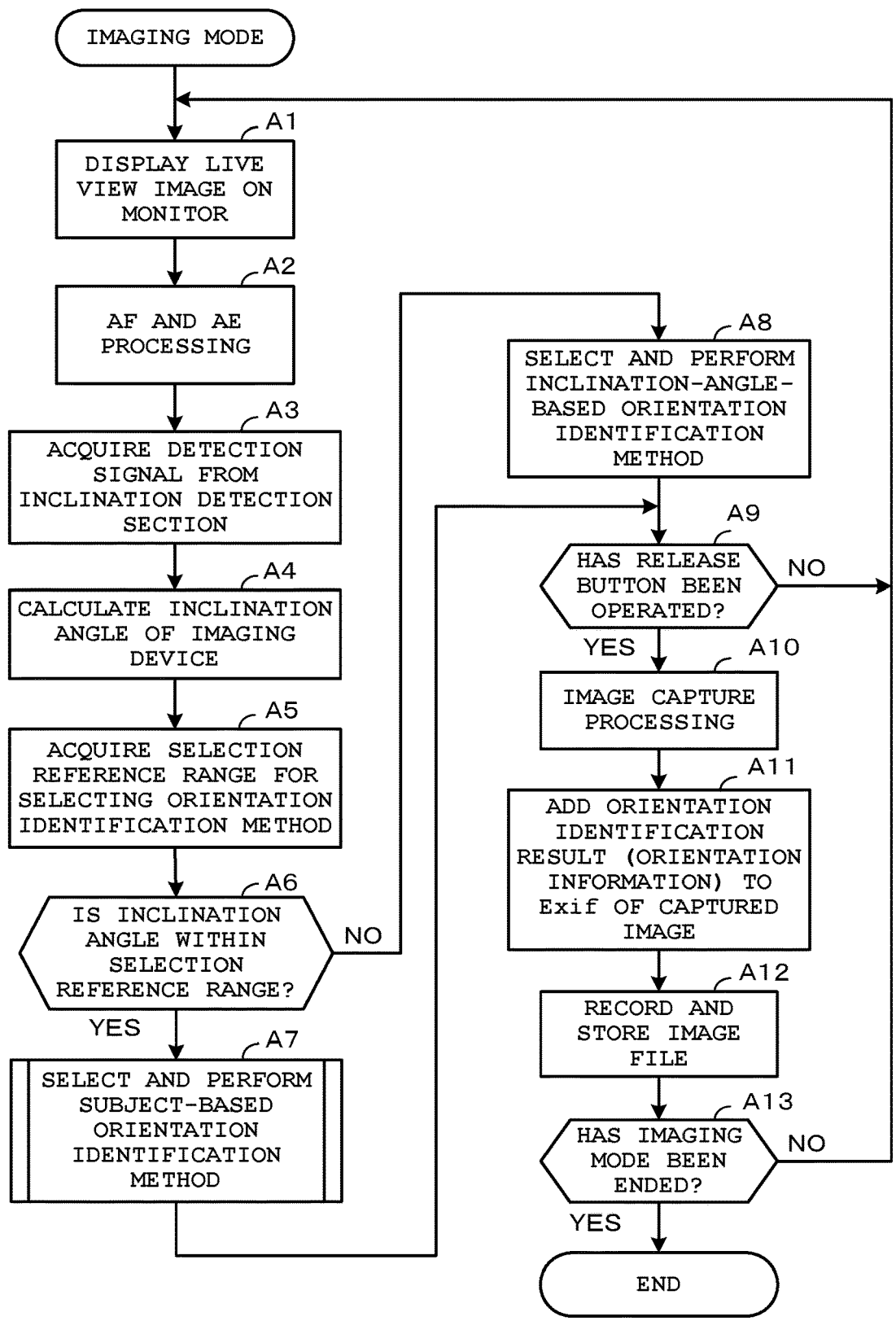
FIG. 4 is a flowchart for describing an operation (characteristic operation of the present embodiment) of the imaging device which is started when a current mode is switched to an imaging mode.
Figure 5:
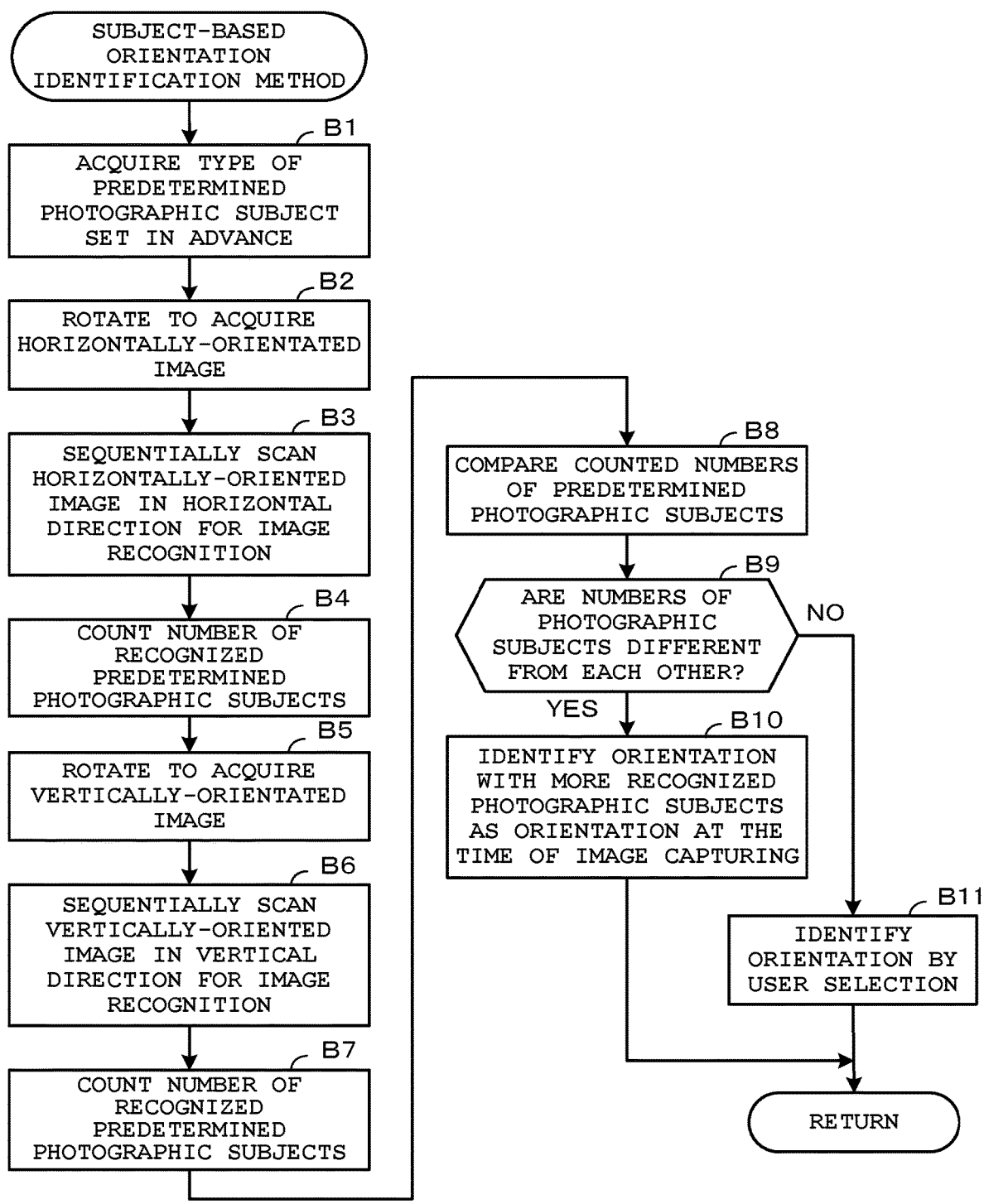
FIG. 5 is a flowchart for describing Step A7 of FIG. 4 in detail (subject-based orientation identification method)

Next, the operation concept of the imaging device in the first embodiment is described with reference to flowcharts shown in FIG. 4 and FIG. 5. Here, each function described in these flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later. FIG. 4 and FIG. 5 show a flowchart outlining the operation of the characteristic portion of the present embodiment from among all of the operations of the imaging device. After exiting this flow of FIG. 4 and FIG. 5, the control section 1 returns to the main flow (omitted in the drawing) of the overall operation.

FIG. 4 is a flowchart for describing an operation (characteristic operation of the present embodiment) of the imaging device which is started when a current mode is switched to an imaging mode.

First, the control section 1 displays, on the monitor, images acquired from the imaging section 7 as a live view image (Step A1), and performs AF (automatic focusing adjustment) processing and AE (automatic exposure adjustment) processing (Step A2). Then, the control section 1 acquires a detection signal from the inclination detection section 8 (Step A3), performs processing of calculating the inclination angle of the imaging device (imaging section 7) (Step A4), and acquires an angle range (selection reference range) that is a reference for selecting an orientation identification method, such as "45°±10°", as an angle range near a boundary threshold value of 45° (Step A5). The control section 1 then judges whether the inclination angle is in the selection reference range of "45°±10°" (Step A6).

Here, when the inclination angle is not within the selection reference range (NO at Step A6), the control section 1 selects the inclination-angle-based orientation identification method and performs specific processing following that method (Step A8). That is, for example, when a boundary threshold value of 45° is set as a predetermined threshold value for identifying the angle range of the first orientation (horizontal imaging orientation) and the angle range of the second orientation (vertical imaging orientation), the control section 1 takes this predetermined threshold value as a boundary, and performs processing of identifying whether the orientation is the horizontal imaging orientation or the vertical imaging orientation based on whether the inclination angle acquired by the inclination detection section 8 is within the angle range on the horizontal orientation side (0° side) or within the angle range on the vertical orientation side (90° side). On the other hand, when the inclination angle acquired by the inclination detection section 8 is within the selection reference range (YES at Step A6), the control section 1 selects the "subject-based orientation identification method" as an orientation identification method and performs specific processing following that method (Step A7).

FIG. 5 is a flowchart for describing Step A7 of FIG. 4 in detail (subject-based orientation identification method).

First, the control section 1 acquires a predetermined photographic subject type arbitrarily set in advance by a user operation (in the present embodiment, character string or person's face) (Step B1). Here, when a "character string" has been set as a predetermined photographic subject type, the control section 1 performs processing of rotating an image captured with the apparatus being diagonally inclined as in FIG. 2A so that it becomes a horizontally-orientated image (refer to FIG. 2B) (Step B2) and then performs character recognition processing of sequentially scanning this horizontally-oriented image in the horizontal direction. That is, the control section 1 performs character recognition processing of recognizing a photographic subject corresponding to this horizontally-oriented image (Step B3) and then counts the number of recognized characters (Step B4). Similarly, when the face of a person has been set as a predetermined photographic subject type, the control section rotates the image captured with the apparatus being diagonally inclined as in FIG. 3A so that it becomes a horizontally-orientated image (refer to FIG. 3B) (Step B2), and then performs face detection processing of sequentially scanning this horizontally-oriented image in the horizontal direction. That is, the control section 1 performs face detection processing of detecting photographic subjects corresponding to this horizontally-oriented image (Step B3) and then counts the number of recognized faces (Step B4).

Next, the control section 1 performs processing of rotating the image captured with the apparatus being diagonally inclined as shown in FIG. 2A or FIG. 3A so that it becomes a vertically-oriented image (refer to FIG. 2C or FIG. 3C) and corresponds to the second orientation (vertical imaging orientation) (Step B5). Then, the control section 1 performs character recognition processing or face detection processing of sequentially scanning this vertically-oriented image in the vertical direction (Step B6), and counts the number of recognized predetermined photographic subjects (the number of characters or persons) (Step B7).

As described above, the control section 1 counts the number of predetermined photographic subjects (the number of characters or persons) recognized by performing image recognition processing (character recognition processing or face detection processing) of sequentially scanning the horizontally-oriented image and the vertically-oriented image from different directions (horizontal direction and vertical directions). Then, the control section 1 compares the processing results acquired by these respective recognition processings, and identifies the orientation of the imaging device (imaging section 7) at the time of image capturing based on the comparison result (Steps B8 to B11).

More specifically, the control section 1 first compares the numbers of photographic subjects (Step B8) to judge whether the numbers of photographic subjects are different from each other (Step B9). Here, when the numbers of photographic subjects are different from each other (YES at Step B9), the control section 1 identifies an orientation with more photographic subjects as an orientation at the time of image capturing. For example, if eighteen characters have been recognized as a result of the sequential scanning of the horizontally-oriented image in the horizontal direction shown in FIG. 2B and twelve characters have been recognized as a result of the sequential scanning of the vertically-oriented image in the vertical direction shown in FIG. 2C, the control section 1 identifies the horizontal imaging orientation (first orientation) corresponding to the orientation with more recognized characters (horizontal orientation) as an orientation at the time of image capturing.

Similarly, when one person has been recognized as a result of the sequential scanning of the horizontally-oriented image in the horizontal direction shown in FIG. 3B and three persons have been recognized as a result of the sequential scanning of the vertically-oriented image in the vertical direction shown in FIG. 3C, the control section 1 identifies the vertical imaging orientation (second orientation) corresponding to the orientation with more recognized persons (vertical orientation) as an orientation at the time of image capturing. On the other hand, when the numbers of photographic subjects are equal to each other (NO at Step B9), the control section 1 proceeds to identification processing that allows an orientation at the time of image capturing to be selected by a user operation (Step B11).

When the orientation at the time of image capturing is identified as described above (Steps A7 and A8 of FIG. 4), the control section 1 judges whether the release button has been operated (Step A9), and returns to the above-described Step A1 so as to repeat the above-described operations until the release button is operated. When the release button is operated during that period (YES at Step A9), the control section 1 acquires an image captured at the timing of this operation, and performs image processing such as development on that image to generate an image file (for example, Exif file) (Step A10). Subsequently, the control section 1 adds and stores, for example, in the Exif information (meta data) of that image file, information regarding the imaging orientation which had been identified at the timing of the release button operation (Step A11). Then, the control section 1 compresses this image file, and stores and saves the compressed file in the image memory 3c (such as a SD card) (Step A12), and judges whether the imaging mode has been ended, that is, the imaging mode has been switched to another mode such as the replay mode (Step A13) When the current mode is still the imaging mode, the control section 1 returns to the above-described Step A1, and repeats the above-described operations thereafter.

Conversely, when the imaging mode is switched to the replay mode and a replay target image is selected, the control section 1 identifies the orientation of the imaging device at the time of the image capturing of this image by reading information indicating the orientation from the Exif information (meta data) of the image file selected as a replay target, and rotates and displays (horizontal display or vertical display) the image such that the orientation of an photographic subject therein coincides with that orientation.

In the above-described example of FIG. 5, the character recognition processing or face detection processing (Steps B2 to B4) of sequentially scanning the horizontally-oriented image in the horizontal direction is performed, and then the character recognition processing or face detection processing (Steps B5 to B7) of sequentially scanning the vertically-oriented image in the vertical direction is performed. However, the present invention is not limited thereto, and a configuration may be adopted in which, when the orientation of the imaging device at the time of image capturing becomes identifiable at the stage of the above-described Step B4, that is, when the number of recognized subjects is equal to or larger than a predetermined number, the orientation at the time of image capturing is identified at that point. Also, the processing from Steps B2 to B4 and the processing from Steps B5 to B7 may be switched.

As described above, in the first embodiment, the control section 1 of the imaging device acquires a captured image, performs image recognition processing of recognizing a photographic subject corresponding to the first orientation in that image so as to judge whether a predetermined photographic subject is present in the image, and identifies, based on the judgment result, whether the orientation of the imaging device (imaging section 7) at the time of image capturing (orientation at the time of image capturing) is the first orientation or the second orientation. As a result of this configuration, the orientation of the imaging section 7 can be easily and appropriately identified only by simple image recognition processing where single scanning is performed in one direction. That is, with the present invention, the problem of the related art can be solved in which a captured image of a photographer himself/herself is required and therefore a judgment as to whether the imaging means is in the horizontal imaging orientation or is in the vertical imaging orientation is complicated, and an orientation at the time of image capturing can be easily and appropriately identified.

Also, the control section 1 identifies whether the orientation of the imaging device at the time of image capturing is the first orientation or the second orientation based on a first judgment result acquired by performing image recognition processing of recognizing a photographic subject corresponding to the first orientation in a captured image so as to judge whether a predetermined photographic subject is present in the image and a second judgment result acquired by performing image recognition processing of recognizing a photographic subject corresponding to the second orientation in the captured image so as to judge whether a predetermined photographic subject is present in the image. As a result of this configuration, by a combination of simple image recognition processings, an orientation at the time of image capturing can be more reliably identified.

Also, the control section 1 compares the above-described first judgment result (the number of predetermined photographic subjects) and the above-described second judgment result (the number of predetermined photographic subjects) and, based on the comparison result, identifies whether the orientation of the imaging device at the time of image capturing is the first orientation or the second orientation. As a result of this configuration, based on the number of photographic subjects whose orientations coincide with an orientation at the time of image capturing, the orientation at the time of image capturing can be more reliably identified.

Moreover, when an inclination angle acquired by the inclination detection section 8 is in a predetermined angle range set in advance, the control section 1 identifies whether the orientation of the imaging device is the first orientation or the second orientation based on the above-described first judgment result. As a result of this configuration, as compared to the case where such orientation identification is always performed, the processing load can be reduced and whereby the power consumption can be reduced.

Furthermore, the control section 1 identifies the orientation of the imaging device at the time of image capturing by using one of the inclination-angle-based orientation identification method and the subject-based orientation identification method. As a result of this configuration, the different identification methods can be used as appropriate.

Still further, the control section 1 uses the first identification method when an inclination angle acquired by the inclination detection section 8 is in a predetermined angle range, and uses the second identification method when this inclination angle is not in the predetermined angle range. As a result of this configuration, the different identification methods can be used as appropriate based on this inclination angle.

Yet still further, in the first identification method, the control section 1 identifies whether the orientation of the imaging device at the time of image capturing is the first orientation or the second orientation based on a first judgment result acquired by performing image recognition processing of recognizing a photographic subject corresponding to the first orientation in a captured image so as to judge whether a predetermined photographic subject is present in the image and a second judgment result acquired by performing image recognition processing of recognizing a photographic subject corresponding to the second orientation in the captured image so as to judge whether a predetermined photographic subject is present in the image. This makes orientation identification more reliable.

Yet still further, information indicating the above-described predetermined angle range can be arbitrarily set by a user operation. As a result of this configuration, a predetermined angle range can be set in consideration of the way of holding the imaging device, the handling habit of the user and the like.

Yet still further, the above-described first orientation is a horizontal imaging orientation for acquiring an image with a horizontal composition and the above-described second orientation is a vertical imaging orientation for acquiring an image with a vertical composition. As a result of this configuration, when an image is replayed, the horizontal or vertical orientation of a photographic subject therein coincides with the orientation of the imaging device at the time of the image capturing.

In the above-described first embodiment, image recognition processing of sequentially scanning a captured image in one direction corresponding to the first orientation and image recognition processing of sequentially scanning the captured image in one direction corresponding to the second orientation are preformed, and the orientation of the imaging device at the time of image capturing is identified based on both of the processing results. However, a configuration may be adopted in which only single image recognition processing of sequentially scanning in one direction corresponding to the first orientation or the second orientation is performed and the orientation of the imaging device at the time of image capturing is identified only from that processing result.

Also, in the above-described first embodiment, in the subject-based orientation identification method shown in FIG. 5, image recognition processing is performed in which an image captured with the imaging device being diagonally inclined as shown in FIG. 2A or FIG. 3A is rotated to be a horizontally-oriented image (refer to FIG. 2B or FIG. 3B) so as to correspond to the first orientation (horizontal imaging orientation) or to be a vertically-oriented image (refer to FIG. 2C or FIG. 3C) so as to correspond to the second orientation (vertical imaging orientation), and then sequential scanning in one direction (horizontal direction or vertical direction) is performed. However, in the subject-based orientation identification method, image recognition processing may be performed in which a diagonally-inclined image is sequentially scanned in one direction (the direction in parallel to that diagonal direction or the direction orthogonal to that diagonal direction) without being rotated to change the orientation.

Moreover, in the above-described first embodiment, when the numbers of photographic subjects are equal to each other as a result of performing image recognition processing corresponding to the first orientation and image recognition processing corresponding to the second orientation (NO at Step B9 of FIG. 5), the control section 1 proceeds to the identification processing (Step B11) where an orientation at the time of image capturing can be selected by a user operation. However, the present invention is not limited thereto. For example, a configuration may be adopted in which, after fine adjustment of the orientation of a horizontally-oriented image or a vertically-oriented image at a predetermined angle (for example, ±2° to 3°), image recognition processing similar to those at Steps B3, B4, B6, and B7 described above is performed again. In this configuration, a limit (for example, twice) may be provided to the number of times of performing the image recognition processing. Also, when the numbers of photographic subjects are equal to each other (NO at Step B9 of FIG. 5), the control section 1 may proceed to Step A8 to select and perform the inclination-angle-based orientation identification method.

Furthermore, in the above-described first embodiment, character strings and human faces are exemplarily taken as predetermined photographic subjects. However, the present invention is not limited thereto, and buildings woods and the like may be taken as predetermined photographic subjects. Also, a configuration may be adopted in which the type of a predetermined photographic subject to be used at Step B1 is automatically set by image recognition.

Second Embodiment

Next, a second embodiment of the present invention is described with reference to FIG. 6A to FIG. 8.

In the above-described first embodiment, the present invention has been applied in an imaging device having a normal standard lens. In the second embodiment, the present invention is applied in an imaging device having a fisheye lens (super-wide angle lens). Note that, in the following descriptions, sections that are basically the same or have the same name as those of the first embodiment are provided with the same reference numerals, and therefore descriptions thereof are omitted. Hereafter, the characteristic portions of the second embodiment are mainly described.

Figure 6A:
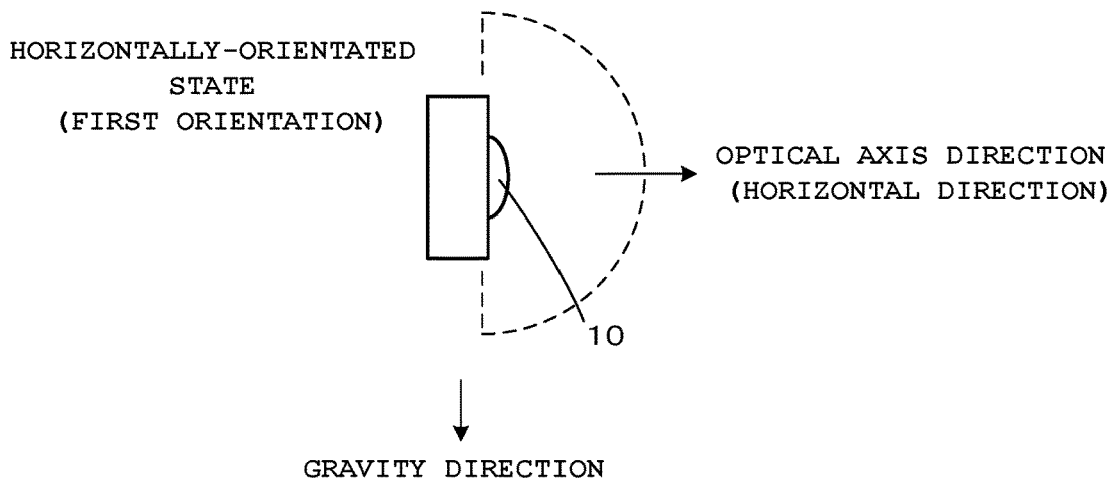
FIG. 6A to FIG. 6C are diagrams for describing a case in a second embodiment in which the orientation of an imaging device with a fisheye lens (super-wide angle lens) at the time of image capturing is a first orientation.
Figure 6B:
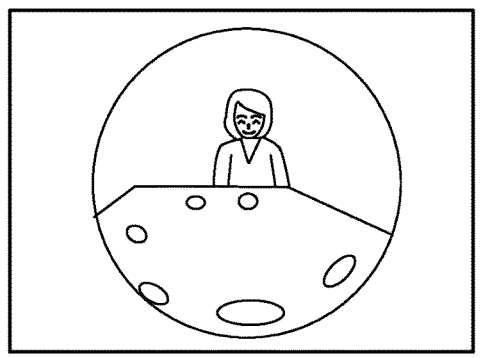
Figure 6C:
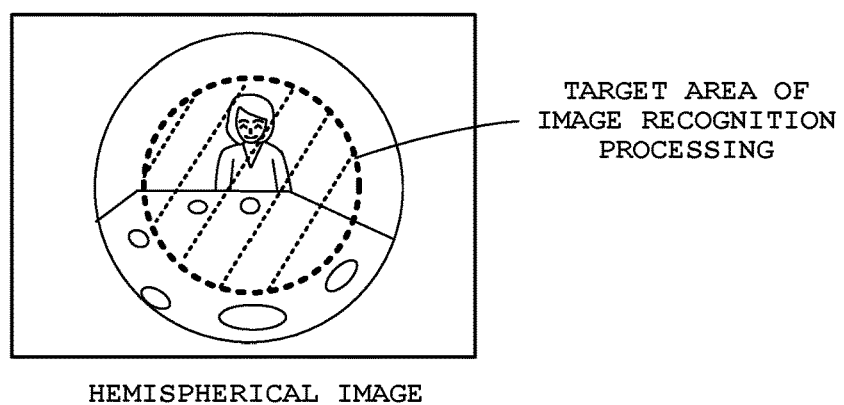
Figure 7A:
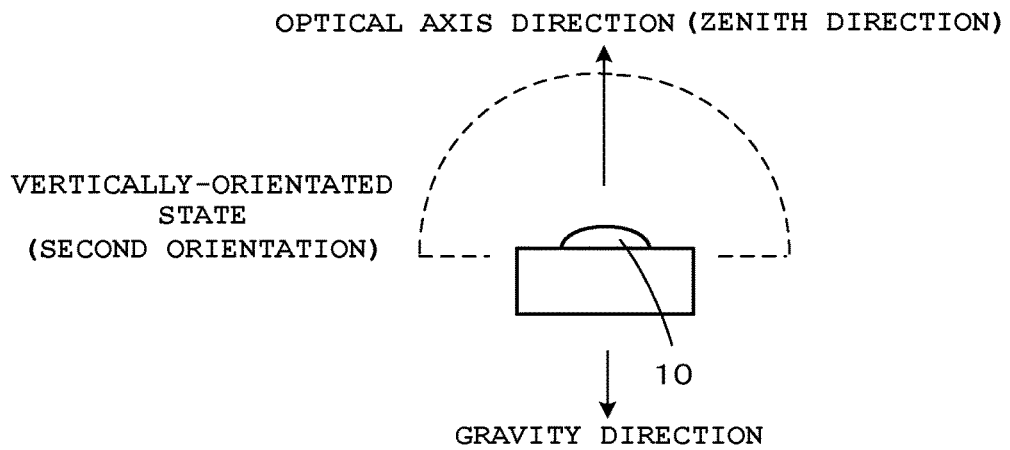
FIG. 7A to FIG. 7C are diagrams for describing a case in the second embodiment in which the orientation of the imaging device with the fisheye lens at the time of image capturing is a second orientation.
Figure 7B:
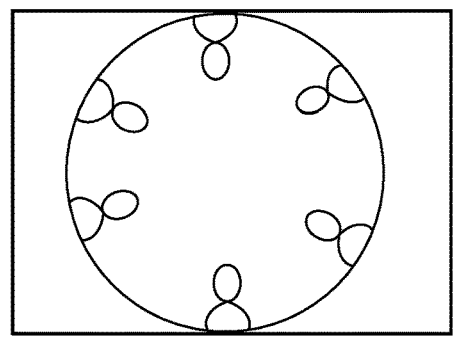
Figure 7C:
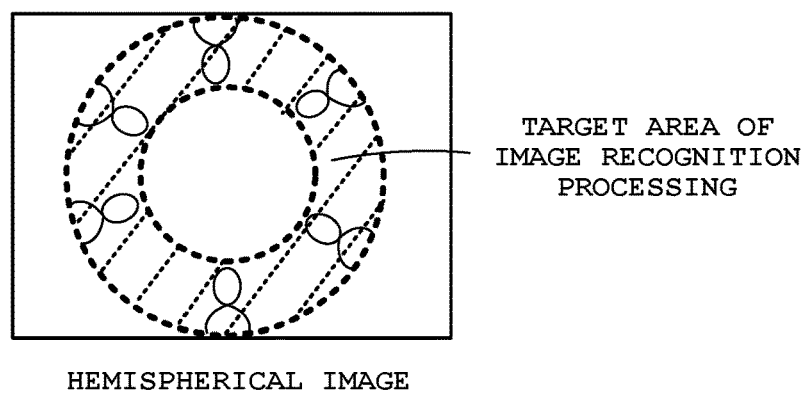

FIG. 6A to FIG. 6C are diagrams describing a case in which an imaging device having a fisheye lens (super-wide angle lens) 10 is in a first orientation at the time of image capturing. FIG. 7A to FIG. 7C are diagrams describing a case in which the imaging device having the fisheye lens 10 is in a second orientation at the time of image capturing. FIG. 6A and FIG. 7A each show the orientation of the imaging device at the time of image capturing. FIG. 6A shows a state in which the optical axis direction of the fisheye lens 10 is substantially orthogonal to the gravity direction (optical axis is in a horizontally-oriented state: first orientation). FIG. 7A shows a state in which the fisheye lens 10 is oriented to the zenith, that is, the imaging direction is substantially equal to the direction opposite to the gravity direction (optical axis is in a vertically-oriented state: second orientation).

Here, the control section 1 identifies the orientation of the imaging device at the time of image capturing based on a detection result acquired by the inclination detection section 8. That is, the control section 1 identifies whether the imaging device is in an orientation where the optical axis of the imaging device has been horizontally oriented (first orientation) or an orientation where the optical axis has been vertically oriented (second orientation). In the drawing, the half celestial sphere indicated by a dotted line represents the imaging range of the fisheye lens 10 whose viewing angle is substantially 180°. FIG. 6B and FIG. 7B each show a hemispherical image captured by the fisheye lens 10. FIG. 6B shows a hemispherical image captured when the imaging device is in the first orientation. FIG. 7B shows a hemispherical image captured when the imaging device is in the second orientation. Since the image captured by the fisheye lens 10 is a circular hemispherical image (fisheye image) using a projective method, the distortion of this image increases from its center to its end (peripheral portion).

FIG. 6C is a diagram in which, in the hemispherical image captured with the imaging section 7 being in the first orientation and the optical axis being horizontally oriented, a center area (area indicated by broken lines in the drawing) is subjected to image recognition processing. This image recognition processing is processing of judging whether a predetermined photographic subject (for example, a person) is present in the center area of the hemispherical image. As described above, in the second embodiment, as a target area of image recognition processing, a center area of an image is associated with the first orientation. Accordingly, in the second embodiment, when a predetermined photographic subject is present in a center area of an image (center area of a hemispherical image) as a result of this imaging recognition processing, a judgment is made that the orientation of the imaging device at the time of image capturing is the first orientation.

FIG. 7C is a diagram in which, in the hemispherical image captured with the imaging section 7 being in the second orientation and the optical axis being vertically oriented, a peripheral area (area indicated by broken lines in the drawing) is subjected to image recognition processing. This image recognition processing is to judge whether a predetermined photographic subject (for example, a person) is present in the peripheral area of the hemispherical image. As described above, in the second embodiment, as a target area of image recognition processing, a peripheral area of an image is associated with the second orientation. Accordingly, in the second embodiment, when a predetermined photographic subject is present in a peripheral area of an image, a judgment is made that the orientation of the imaging device at the time of image capturing is the orientation shown in FIG. 7A (second orientation).

Figure 8:
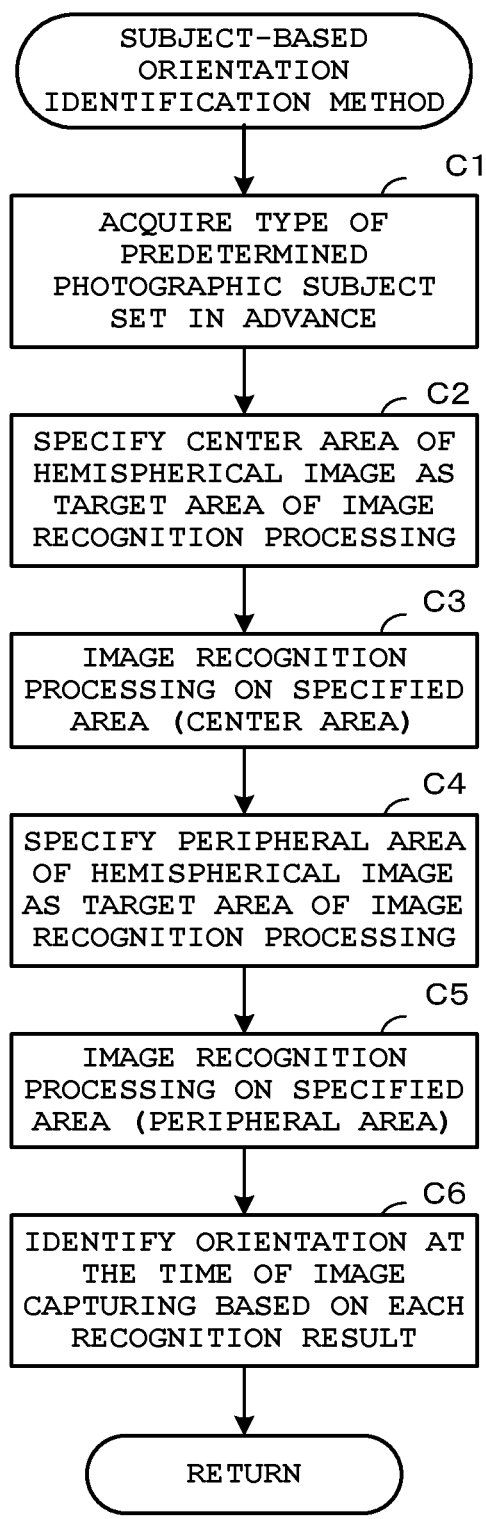
FIG. 8 is a flowchart for describing in detail Step A7 of FIG. 4 (subject-based orientation identification method) in the second embodiment.

FIG. 8 is a flowchart for describing Step A7 of FIG. 4 (subject-based orientation identification method) for the second embodiment.

First, the control section 1 acquires a type of a predetermined photographic subject set in advance (for example, a building or person) (Step C1). Then, the control section 1 acquires a hemispherical image, identifies a center area of the image as a target area of image recognition processing (Step C2), and performs image recognition processing of judging whether a predetermined photographic subject is present in this identified area (Step C3). Next, the control section 1 identifies a peripheral area of the hemispherical image as a target area of image recognition processing (Step C4), and performs image recognition processing of judging whether the predetermined photographic subject is present in this identified area (Step C5).

Then, the control section 1 identifies based on the processing results at the above-described Steps C3 and C5 whether the orientation of the imaging device at the time of image capturing is an orientation where the optical axis of the imaging section 7 has been horizontally oriented (first orientation) or an orientation where the optical axis has been vertically oriented (second orientation) (Step C6). For example, when the predetermined photographic subject is present in the center area of the hemispherical image but is not present in the peripheral area of the hemispherical image, the control section 1 identifies that the orientation at the time of image capturing is the first orientation. Conversely, when the predetermined photographic subject is present in the peripheral area of the hemispherical image but is not present in the center area of the hemispherical image, the control section 1 identifies that the orientation at the time of image capturing is the second orientation.

As with the first embodiment, in the second embodiment as well, a configuration may be adopted in which the number of predetermined photographic subjects recognized in a hemispherical image is counted and an orientation associated with an area having more subjects is identified as the orientation of the imaging device at the time of image capturing. Also, in a case where the above-described predetermined photographic subject is present or not present in both areas, selection by a user operation may be accepted to specify the orientation of the imaging device at the time of image capturing. Also, a configuration may be adopted in which the type of the predetermined photographic subject for use at Step C1 is automatically set by image recognition.

Also, a configuration may be adopted in which, when the orientation of the imaging device at the time of image capturing becomes identifiable at the stage of Step C3, that is, when the number of recognized subjects is equal to or larger than a predetermined number, the orientation of the imaging device at the time of image capturing is identified at that point. Moreover, the processing from Steps C2 to C3 and the processing from Steps C4 to C5 may be switched.

As described above, in the second embodiment, the control section 1 of the imaging device performs image recognition processing of sequentially scanning one of a peripheral area and a center area of a captured hemispherical image associated with the first orientation so as to judge whether a predetermined photographic subject is present in that area and, based on the judgment result, identifies whether the orientation of the imaging device at the time of image capturing is the first orientation or the second orientation. As a result of this configuration, the orientation of the imaging device at the time of image capturing can be easily and appropriately identified only by performing simple image recognition processing of scanning a partial area corresponding to the orientation at the time of image capturing. That is, with the present invention, the problem of the related art can be solved in which a captured image of a photographer himself/herself is required and therefore a judgment as to whether the imaging means is in the horizontal imaging orientation or is in the vertical imaging orientation is complicated, and an orientation at the time of image capturing can be easily and appropriately identified.

Also, the control section 1 identifies whether the orientation of the imaging device at the time of image capturing is the first orientation or the second orientation based on a first judgment result acquired by performing image recognition processing of sequentially scanning one (one area) of peripheral and center areas of a captured hemispherical image associated with the first orientation so as to judge whether a predetermined photographic subject is present in that area and a second judgment result acquired by performing image recognition processing of sequentially scanning an area (the other area) associated with the second orientation so as to judge whether the predetermined photographic subject is present in that area. As a result, by a combination of simple image recognition processings, an orientation at the time of image capturing can be more reliably identified.

Moreover, when a judgment is made that a predetermined photographic subject is present in a center area of a hemispherical image, the control section 1 identifies that the orientation of the imaging device at the time of image capturing is the first orientation where the optical axis of the imaging section 7 has been horizontally oriented. When a judgment is made that the predetermined photographic subject is present in a peripheral area of the hemispherical image, the control section 1 identifies that the orientation is the second orientation where the optical axis of the imaging section 7 has been vertically oriented. As a result of this configuration, as the orientation of the imaging device at the time of image capturing, an orientation suitable for image capturing using a fisheye lens (super-wide angle lens) 10 can be appropriately specified.

In the above-described second embodiment, image recognition processing of sequentially scanning one (one area) of peripheral and center areas of a captured hemispherical image associated with the first orientation and image recognition processing of sequentially scanning an area (the other area) associated with the second orientation are performed. Then, based on both of the processing results, whether the orientation of the imaging device at the time of image capturing is the first orientation or the second orientation is identified. However, the present invention is not limited thereto, and a configuration may be adopted in which only single image recognition processing of sequentially scanning one area associated with the first orientation or the second orientation is performed and the orientation of the imaging device at the time of image capturing is identified from the processing result.

Also, in the above-described second embodiment, the first orientation is associated with a center area of an image and the second orientation is associated with a peripheral area of the image. However, the relation between them may be arbitrarily changed in accordance with the position of the photographic subject.

Moreover, in each of the above-described embodiments, a compact camera has been exemplarily described as an imaging device to which the present invention has been applied. However, the present invention is not limited thereto, and can be applied to a camera-function-equipped personal computer, a PDA (Personal Digital Assistant), a tablet terminal device, a portable telephone such as a smartphone, an electronic game/music player, an electronic watch and the like. Also, for implementation of the present invention, a configuration may be adopted in which inclination information in the present embodiment (here, information regarding the orientation (inclination) of the imaging means at the time of image capturing) is added to an image captured by the imaging means and then that image is transferred to another external device (another image processing device) so as to judge therein whether the orientation is the first orientation or the second orientation.

Furthermore, the "apparatuses" or the "sections" described in the above-described embodiments are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image processing device which identifies whether an orientation of an imaging section at time of image capturing is a first orientation or a second orientation, the first orientation and the second orientation having different directions from each other, comprising:
  a memory; and
  a Central Processing Unit (CPU), wherein the CPU performs, based on a program stored in the memory, processing including:
    acquiring an image captured by the imaging section;
    detecting an inclination angle of the imaging section at the time of image capturing;
    performing first image recognition processing of recognizing a photographic subject corresponding to the first orientation in the acquired image so as to judge whether a predetermined photographic subject is present in the image; and
    identifying whether the orientation of the imaging section at the time of image capturing is the first orientation or the second orientation based on the judgment result, when the detected inclination angle is within a predetermined angle range set in advance.

2. The image processing device according to claim 1, wherein the CPU (i) performs second image recognition processing of recognizing a photographic subject corresponding to the second orientation in the acquired image so as to judge whether a predetermined photographic subject is present in the image, and (ii) identifies whether the orientation of the imaging section at the time of image capturing is the first orientation or the second orientation based on the judgment result acquired by the first image recognition processing and a judgment result acquired by the second image recognition processing.

3. The image processing device according to claim 2, wherein the CPU counts, every time a judgment is made by the first image recognition processing that predetermined photographic subjects are present in the image, number of the predetermined photographic subjects so as to acquire a count value as a first count value,
  wherein the CPU counts, every time a judgment is made by the second image recognition processing that predetermined photographic subjects are present in the image, number of the predetermined photographic subjects so as to acquire a count value as a second count value,
  wherein the CPU compares the first count value and the second count value,
    and wherein the CPU identifies whether the orientation of the imaging section at the time of image capturing is the first orientation or the second orientation based on a result of the comparison between the first count value and the second count value.

4. The image processing device according to claim 1, wherein the CPU sets information indicating the predetermined angle range.

5. The image processing device according to claim 1, wherein the first orientation is a horizontal imaging orientation for acquiring an image with a horizontal composition, and the second orientation is a vertical imaging orientation for acquiring an image with a vertical composition.

6. An image processing device which identifies whether an orientation of an imaging section at time of image capturing is a first orientation or a second orientation, the first orientation and the second orientation having different directions from each other, comprising:
  a memory; and
  a Central Processing Unit (CPU), wherein the CPU performs, based on a program stored in the memory, processing including:
    acquiring an image captured by the imaging section;
    detecting an inclination angle of the imaging section at the time of image capturing;
    performing first image recognition processing of recognizing a photographic subject corresponding to the first orientation in the acquired image so as to judge whether a predetermined photographic subject is present in the image; and
    performing (i) identification of the first orientation or the second orientation based on the judgment result, and (ii) identification of the first orientation or the second orientation based on a result of comparison between the detected inclination angle and a predetermined threshold value.

7. The image processing device according to claim 6, wherein the CPU identifies whether the orientation of the imaging section at the time of image capturing is the first orientation or the second orientation based on the judgment result acquired by the first image recognition processing, when the inclination angle detected by the inclination detection section is within a predetermined angle range set in advance, and
  wherein the CPU identifies whether the orientation of the imaging section at the time of image capturing is the first orientation or the second orientation based on the result of the comparison between the inclination angle detected by the inclination detection section and the predetermined threshold value, when the inclination angle detected by the inclination detection section is not within the predetermined angle range set in advance.

8. The image processing device according to claim 7, wherein the CPU (i) performs second image recognition processing of recognizing a photographic subject corresponding to the second orientation in the acquired image so as to judge whether a predetermined photographic subject is present in the image, and (ii) identifies whether the orientation of the imaging section at the time of image capturing is the first orientation or the second orientation based on the judgment result acquired by the first image recognition processing and a judgment result acquired by the second image recognition processing, when the inclination angle detected by the inclination detection section is within the predetermined angle range set in advance.

9. The image processing device according to claim 6, wherein the CPU (i) performs second image recognition processing of recognizing a photographic subject corresponding to the second orientation in the acquired image so as to judge whether a predetermined photographic subject is present in the image, and (ii) identifies whether the orientation of the imaging section at the time of image capturing is the first orientation or the second orientation based on the judgment result acquired by the first image recognition processing and a judgment result acquired by the second image recognition processing.

10. An image processing method for identifying whether an orientation of an imaging section at time of image capturing is a first orientation or a second orientation, the first orientation and the second orientation having different directions from each other, comprising:
  acquiring an image captured by the imaging section,
  detecting an inclination angle of the imaging section at the time of image capturing;
  performing image recognition processing of recognizing a photographic subject corresponding to the first orientation in the acquired image so as to judge whether a predetermined photographic subject is present in the image; and identifying whether the orientation of the imaging section at the time of image capturing is the first orientation or the second orientation based on the judgment result, when the detected inclination angle is within a predetermined angle range set in advance.

11. A non-transitory computer-readable storage medium having stored thereon a program that is executable by a computer of an image processing device which identifies whether an orientation of an imaging section at time of image capturing is a first orientation or a second orientation, the first orientation and the second orientation having different directions from each other, the program being executable by the computer to actualize functions comprising:

acquiring an image captured by the imaging section;

detecting an inclination angle of the imaging section at the time of image capturing;

performing image recognition processing of recognizing a photographic subject corresponding to the first orientation in the acquired image so as to judge whether a predetermined photographic subject is present in the image; and identifying whether the orientation of the imaging section at the time of image capturing is the first orientation or the second orientation based on the judgment result, when the detected inclination angle is within a predetermined angle range set in advance.

12. An image processing method for identifying whether an orientation of an imaging section at time of image capturing is a first orientation or a second orientation, the first orientation and the second orientation having different directions from each other, comprising:

acquiring an image captured by the imaging section, detecting an inclination angle of the imaging section at the time of image capturing;

performing image recognition processing of recognizing a photographic subject corresponding to the first orientation in the acquired image so as to judge whether a predetermined photographic subject is present in the image; and performing (1) identification of the first orientation or the second orientation based on the judgment result, and (ii) identification of the first orientation or the second orientation based on a result of comparison between the detected inclination angle and a predetermined threshold value.

13. A non-transitory computer-readable storage medium having stored thereon a program that is executable by a computer of an image processing device which identifies whether an orientation of an imaging section at time of image capturing is a first orientation or a second orientation, the first orientation and the second orientation having different directions from each other, the program being executable by the computer to actualize functions comprising:

acquiring an image captured by the imaging section, detecting an inclination angle of the imaging section at the time of image capturing;

performing image recognition processing of recognizing a photographic subject corresponding to the first orientation in the acquired image so as to judge whether a predetermined photographic subject is present in the image; and performing (i) identification of the first orientation or the second orientation based on the judgment result, and (ii) identification of the first orientation or the second orientation based on a result of comparison between the detected inclination angle and a predetermined threshold value.

\* \* \* \* \*